T. UMRATH.
DAIRY MACHINERY.
APPLICATION FILED FEB. 23, 1909.
1,010,328.
Patented Nov. 28, 1911.
5 SHEETS—SHEET 3.
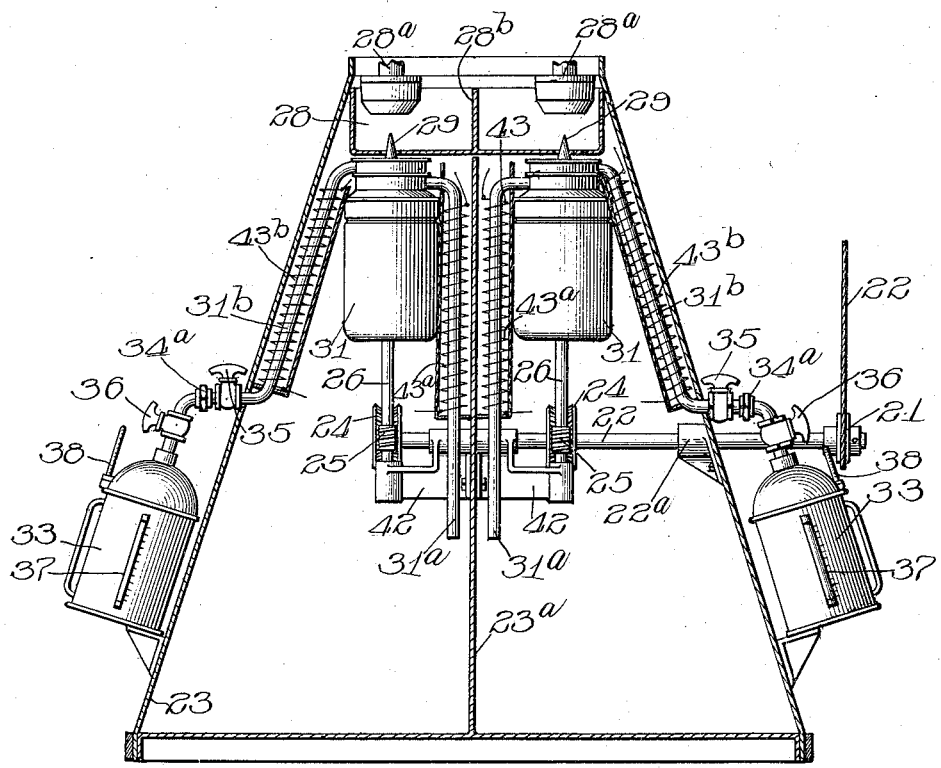
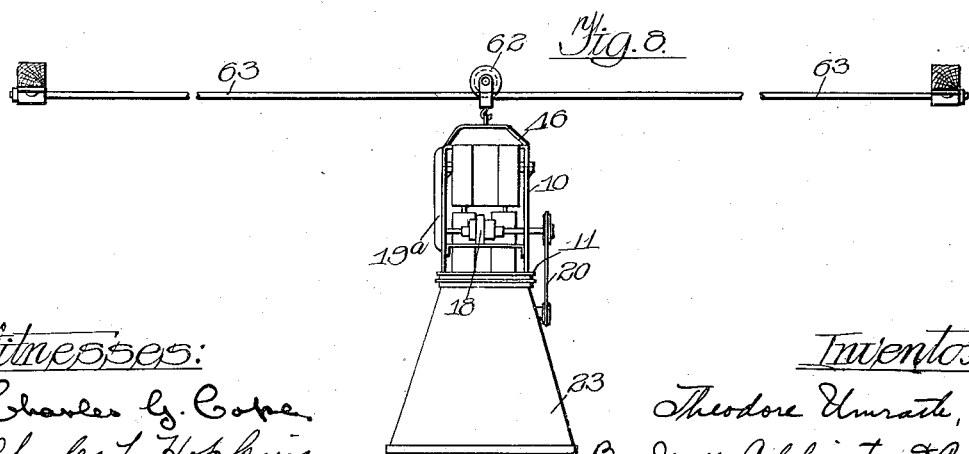

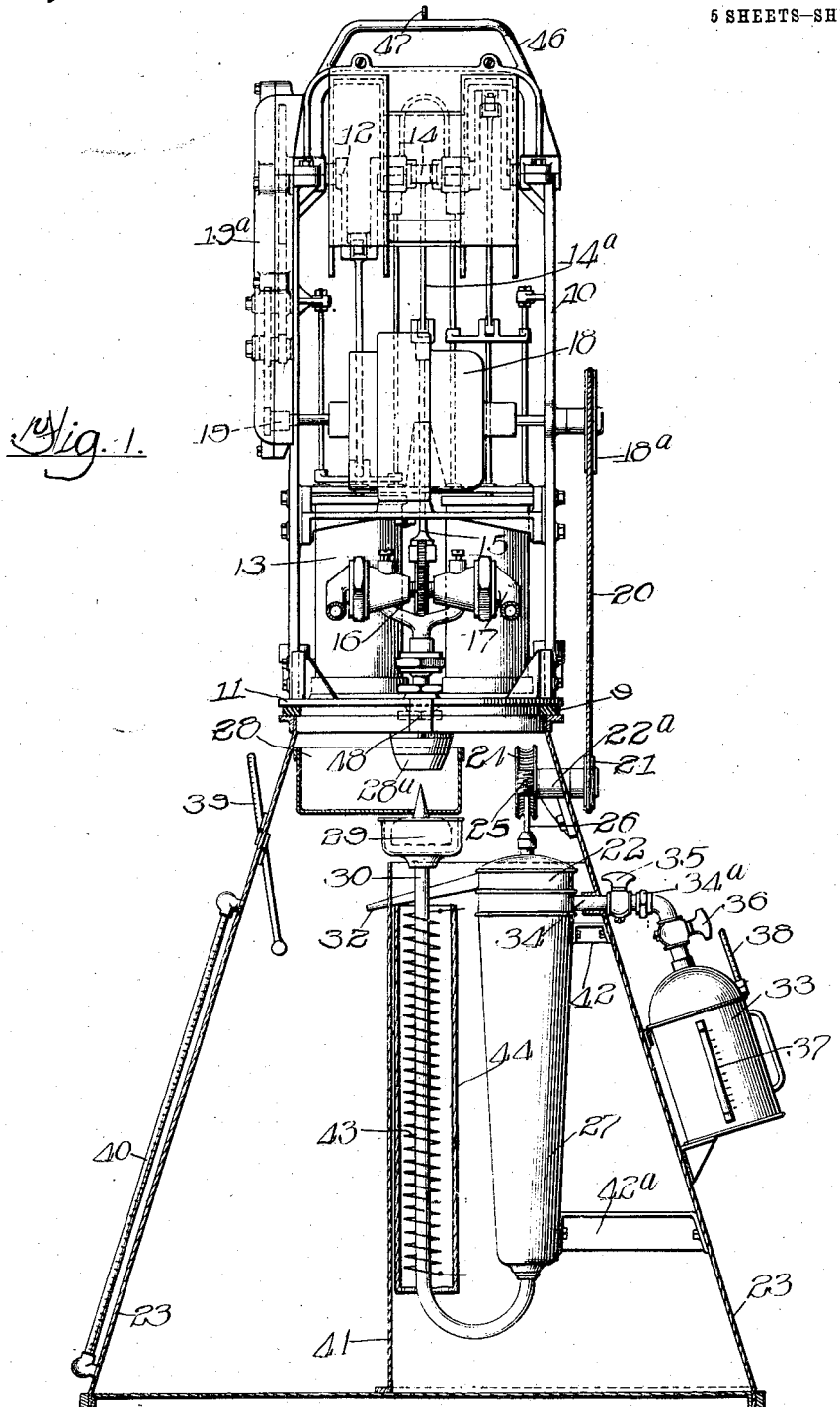

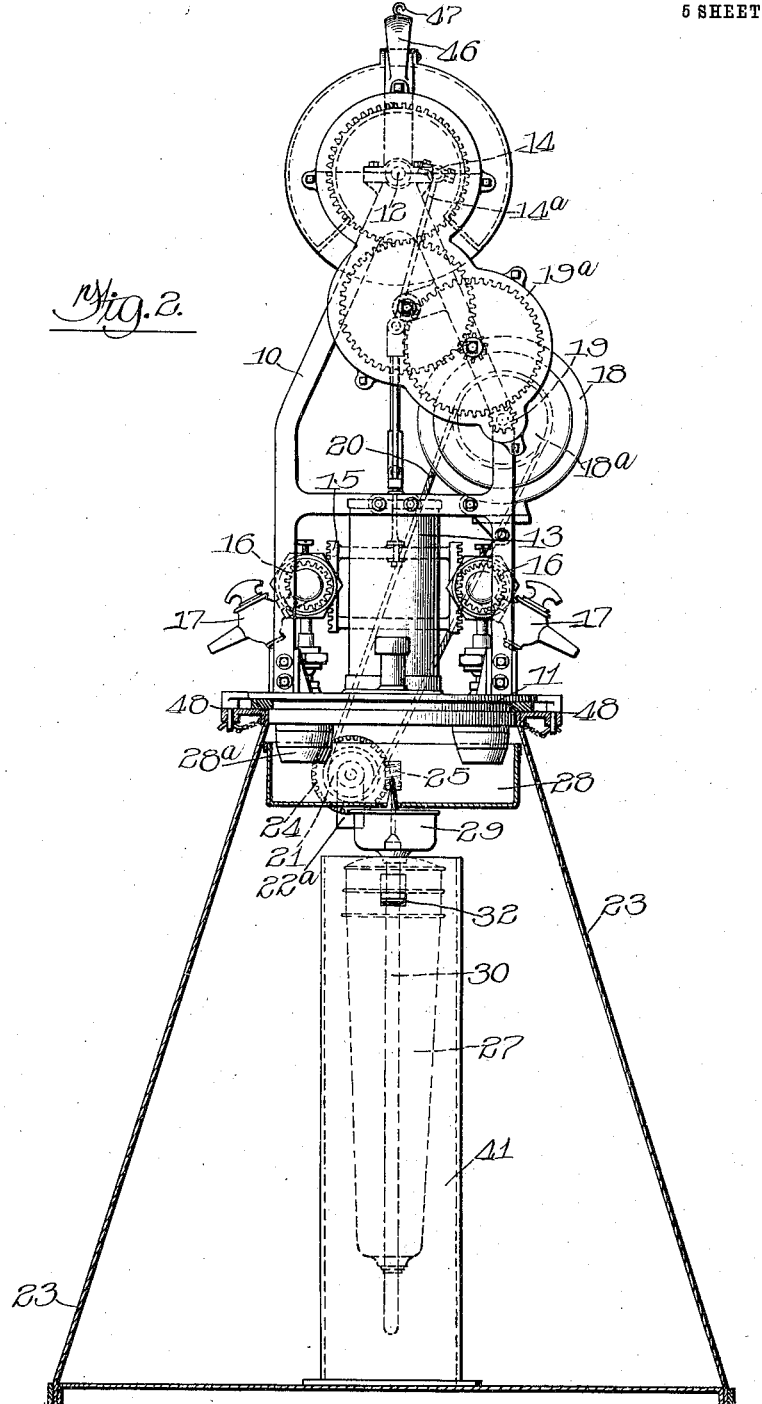

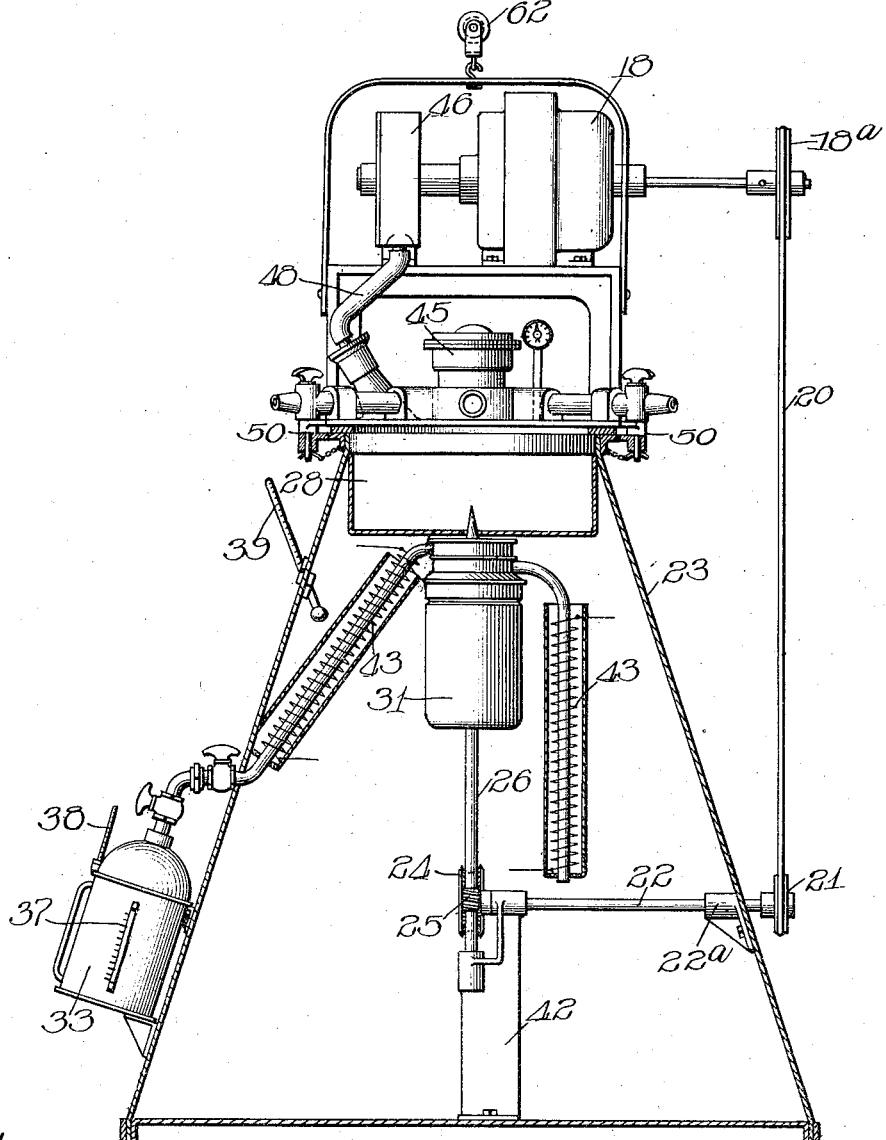

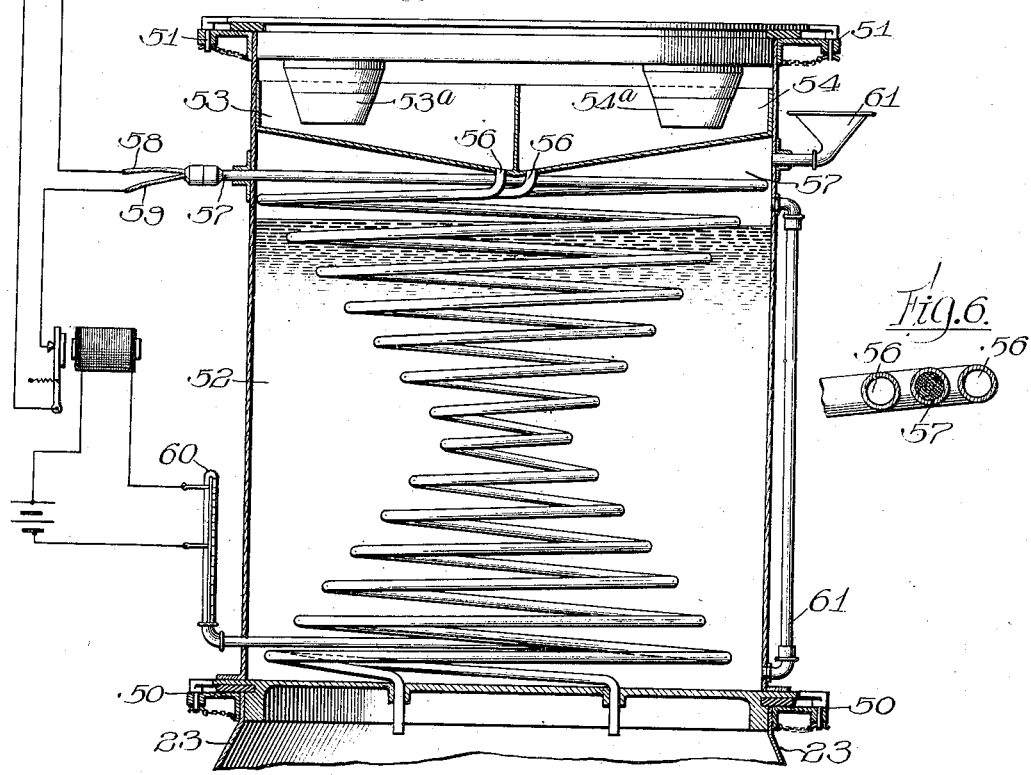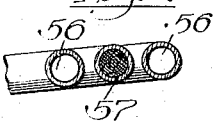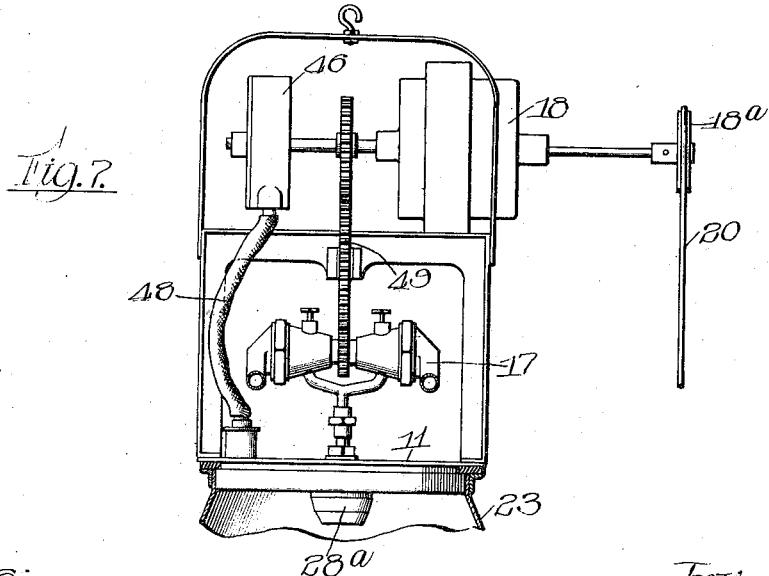

UNITED STATES PATENT OFFICE.

THEODORE UMRATH, OF CHICAGO, ILLINOIS, ASSIGNOR TO LIBERTY COW MILKER COMPANY, OF HAMMOND, INDIANA, A CORPORATION OF INDIANA.

DAIRY MACHINERY.

1,010,328.

Specification of Letters Patent.   Patented Nov. 28, 1911.

Application filed February 23, 1909.   Serial No. 479,396.

*To all whom it may concern:*

Be it known that I, THEODORE UMRATH, a citizen of the United States, residing at Chicago, in the county of Cook and State of Illinois, have invented new and useful Improvements in Dairy Machinery, of which the following is a full, clear, concise, and exact description, reference being had to the accompanying drawing, forming a part of this specification.

This invention relates to improvements in milking machines, the object of the invention being the general improvement of machines of this type.

In an application filed by me June 27th, 1908, Serial No. 440,609, and in a second application filed December 19th, 1908, Serial No. 468,304, I have shown milking machines of the general type of those shown in the present application, and the present inventions are in the nature of additional improvements on said machines.

In the accompanying drawings, Figure 1 is a front view of the milking machine, with the lower portion thereof in vertical section; Fig. 2 is a view similar to Fig. 1, but looking at the machine from one side; Fig. 3 is a sectional view through the lower part of a modified form of machine; Fig. 4 is a view similar to Fig. 3, but showing another modification; Fig. 5 shows an improved form of apparatus for heating milk to a sterilizing temperature during its passage to the receptacle of the machine; Fig. 6 is a fragmentary view of a detail of construction relating to the apparatus shown in Fig. 5; Fig. 7 shows a modified form of apparatus in which a rotary air pump is used instead of the reciprocating form shown in Figs. 1 and 2; and Fig. 8 is a view showing the milking machine attached on a trolley.

In my earlier applications, above identified, I have shown milking machines in which the operation of extracting the milk is performed by a machine mounted on the cover of a receptacle, and in one instance the machine has been shown as provided with means for heating the milk to a sterilizing or pasteurizing temperature while on its way to said receptacle. There is also shown in the second of said applications means whereby the milk from each of the two cows simultaneously milked is kept separate, whereby it is possible to keep individual records of the milk production of the different cows.

I have found that in practice it is usually considered more desirable to be able to ascertain the total amount of butter fat yielded by each cow than to be able to determine the amount of milk derived from each cow. Some cows give a small quantity of milk which is very rich in butter fat, while others give a much larger quantity of milk, but of such poor quality that the amount of butter fat is less than that given by the cows which give less milk.

Experience has demonstrated that when milk has just been extracted from the cow, and while it remains at the bodily temperature of the cow, it very readily takes up germs of various kinds, and that these germs multiply with great rapidity while the milk remains at this temperature. In the machines hereinafter described the milk is not allowed to come in the barn into contact with the air at any time until after it has been separated into cream and skim milk, as well as heated and cooled.

In the form of machine shown in Figs. 1 and 2, I employ a main frame 10 mounted on a base 11, which forms the cover for and fits air-tight upon the upper edge of a suitable receptacle. Journaled in suitable bearings in the frame 11 is a crank-shaft 12 operating alternately a pair of vacuum pumps 13, 13. The shaft 12 has also a crank 14, which is connected by means of a rod 14ª with a structure 15 having a rack or series of teeth along each of its vertical sides. This frame 15 is reciprocated vertically during the operation of the machine and the rack teeth engage suitable pinions 16, 16, each of which is mounted on the shaft of a double pulsator 17 similar in general construction and operation to the pulsator illustrated in my former application, Serial No. 468,304.

The crank-shaft 12 is revolved by an electric motor 18, which is suitably supported upon the frame 11 and carries upon one end of its shaft a pinion 19, connected to the crank-shaft by a suitable train of reducing gearing inclosed in a housing 19ª. On the opposite end of the motor shaft is a pulley 18ª connected by means of a belt 20 with a second pulley 21. This pulley 21 is mounted on a shaft 22 which turns in a suitable bearing 22ª and extends through the wall of and into the interior of the receptacle 23. Upon the inner end of this shaft is arranged one of the members 24 of a worm-gear, the other member 25 of which is mounted upon the upper end of the revolving spindle 26 of a cream separator 27, which may be of any approved form and need not be herein described in detail.

Arranged within the upper part of the receptacle 23 is a small receptacle 28 which is connected by means of a float valve 29 and a tube 30 with the separator 27. The milk passes through a filter 28ª before it reaches the receptacle 28. The skim milk from the separator 27 discharges through a tube 32 into the receptacle 23, while the cream finds its way to the exterior of the receptacle 23 and into a removable can 33 through a tube 34 containing valves 35 and 36. A separable coupling 34ª in the pipe 34 provides means whereby after the valves 35 and 36 have been closed, the can 33 containing the cream may be disconnected from the machine and taken to the cooling room of the dairy. An empty receptacle may then be substituted in place of the one that has been taken away, and after the coupling 34ª has been closed the valve 35 attached to the pipe 34, and the valve 36 on the can may be opened and communication thereby established between the separator 27 and the can. The can that has been taken to the cooler, with its contents, may be cooled to proper temperature and may then be opened and the contents be put into bottles for marketing. The removable receptacle or can 33 is provided with a glass tube 37, by inspection of which the amount of cream contained in the can may be determined. The side of the can is marked with proper graduations, whereby the amount of liquid in the can may be learned by reading the graduation at the level at which the cream stands.

In order that the temperature of the cream may be known, the can 33 is provided with a thermometer 38 having its bulb within the can and its graduated portion extending therefrom. The temperature of the skim milk may also be determined by reading a thermometer 39, the bulb of which is located within the receptacle 33 and the graduated portion of which extends to the exterior of said receptacle. A glass sight tube 40 is arranged vertically on the receptacle 23, by inspection of which the height of the skim milk in the receptacle may be determined. The separator 27 is inclosed in a small compartment of its own, formed by a partition 41, and is supported in position in said compartment by suitable means such as brackets 42 and 42ª.

For the purpose of raising the temperature of the milk to a point somewhat higher than the bodily temperature of the cow, as is desirable in some cases in order that the separator may work with its greatest efficiency, the pipe 30 which conducts the milk to the separator is surrounded by an electric heating coil 43, this portion of the pipe 30 and the coil 43 being contained in a suitable tank 44 which is preferably filled with a liquid in order that the heat given off by the coil 43 will be equally distributed over the pipe 30.

In Fig. 3 I have shown a machine in the use of which the skim milk and cream produced by two cows are kept separate, thereby making it possible to keep individual records of the different cows. In this machine the receptacle 23 is separated into two similar compartments by means of a vertical partition 23ª. The shaft 22ˣ is journaled in bearings 23ª, 42ˣ and operates two worm-gears 24ˣ, which intermesh with pinions 25ˣ on the spindles 26ˣ of separators 31.

In the upper portion of the receptacle 23 is located a smaller receptacle 28ˣ, as in the form of machine already described, this receptacle being however, in this form of the machine, divided into two parts by a partition 28ᵇ. Float valves 29 control the flow of milk from the compartments of the receptacle 28ˣ to the separators. In this form of the machine means are provided whereby the cream and skim milk are heated to a sterilizing or pasteurizing temperature after the process of separating the milk has been completed. This is done by arranging heating coils, designated 43ª, around the discharge tubes 31ª of the separators and similar heating coils 43ᵇ around the discharge tubes 31ᵇ which lead from the separators to the removable receptacles or cans 33. The valves 35 and 36 illustrated and described in connection with the machine shown in Figs. 1 and 2 are likewise provided on this machine.

It is well known that centrifugal cream separating machines work with greater efficiency if the milk is supplied thereto at a temperature as high as, or slightly higher than that of the body of the cow. In the use of my improved milking machine I am enabled to conduct the milk to the cream separator without the loss of any perceptible amount of the heat which it possesses when taken from the cow and I am, therefore, able to so completely separate the butter fat from the skim milk that scarcely any butter fat will be left in the skim milk.

I have found in practice that centrifugal cream-separating devices, when operated exposed to the open air, have to overcome considerable friction from the air. By operating the separators in a vacuum I am enabled to materially reduce the power required.

When cream separators are operated in the open air the milk both before and after separation is necessarily exposed to the bacteria contained in the air. This is especially true because of the fact that the milk is ordinarily poured into an open can from which it passes into the machine, and as the cream and skim milk issue from the discharge spouts into pails or other open receptacles, it very readily takes up germs from the air.

In my milking machine I am able to take the milk from the cow, separate the same into skim milk and cream, and sterilize either or both of the products, all without the possibility of the milk or cream coming into contact with the atmosphere, and therefore with no opportunity to take up bacteria or impurities, such as dust. I am enabled also, if desired, to keep the milk of each cow separate from that of all the others so that not only may a record be kept of the production of each cow, but the milk from any single cow may be subjected to bacteriological or such other tests as may be desired.

In the form of machine which is shown in Fig. 4, a form of pulsator differing from that shown in my former applications is employed and is designated 45. This form of pulsator is operated automatically by vacuum, and is well known in the milking machine art. In this machine I have also substituted for the pair of reciprocating vacuum pumps shown in my earlier applications for exhausting the receptacle, other means consisting of a small rotary air pump 46 connected by means of a tube 48 with the cover 11. The shaft of the motor 18 is connected at one end to the rotating part of said pump, and upon the opposite end of said shaft is mounted the pulley 18ª, driving the belt 20 for operating the separator, as in the form of machine shown in Fig. 3 and hereinabove described.

In the form of machine shown in Fig. 7, the style of pulsator shown in Figs. 1 and 2 is retained, but the rotary form of pump 46 is employed in place of the reciprocating pump. For operating the pulsators from the shaft of the motor, a suitable train of reducing gearing 49 is provided.

By heating the milk before separation to a temperature slightly above the bodily temperature of the cow, the extraction of the butter fat from the milk may, in some instances, be more completely effected. In this case the device shown in Fig. 5 may be utilized, either in combination with the means shown in Figs. 1 and 2 or alone. When the device of Fig. 5 is to be used, it is placed upon the receptacle 23 and is secured in position thereon by means of suitable clamps 50. The milking machine proper is then placed in position upon the top of the heating device and is secured in position thereon by clamps 51. This device comprises a tank 52 having in its upper portion two compartments 53 and 54 provided with filters 53ª, 54ª, into which the milk is discharged from the milking machine proper when in position on the top of the receptacle 52. Leading from each compartment is a tube 56, these tubes extending side by side in a spiral path through the tank and discharging through the bottom thereof into the receptacle 23. Arranged between the tubes 56, and extending parallel therewith, is a tube 57, in which is arranged an electric heating rheostat connected by means of wires 58 and 59 to a suitable source of supply of electric current. The tank 52 is preferably filled with a liquid, such as water, whereby the heat evolved by the electric heating apparatus is evenly discharged to the pipes 56. The temperature of the tank is kept uniform by means of an electrical thermostat 60 arranged to complete a local circuit when the temperature of the contents of the tank rises above a given point. This circuit includes a relay or other suitable means for automatically opening the circuit of the heating apparatus upon the completion of the local circuit through the thermostat. By this means, when the temperature of the contents of the tank becomes too high, the automatic switch is opened and the current is cut off until such time as the temperature falls below a certain predetermined point, whereupon the circuit will be reëstablished and current will flow through the heating rheostat. A glass sight tube 61 extends vertically on the side of the tank 52, showing the height of the liquid in the tank.

In the use of centrifugal cream separators it has been found that in order to operate successfully the spindle of the machine must be in an absolutely vertical position. I have found that if my machine be suspended from some suitable support it will, by its own weight, be balanced so as to hang absolutely vertical. Furthermore, as by so suspending the machine it is kept out of all contact with the floor of the stable, it is thus maintained in a cleaner and more sanitary condition than if resting upon the floor. Another advantage of suspending the machine in this manner is that it is impossible for the machine to be tipped over if a cow should come too close to the machine. For convenience in handling the machine, I may arrange upon the upper portion of the frame thereof a trolley wheel 62 which runs on a track 63 suspended by suitable means and extending through the stable behind the cows. By the use of this trolley system the machine may be run along the trolley from the stable to the dairy room after the operation of milking two cows has been completed, where the removable cans 33 may be taken off and others substituted. The machine will then be run back along the trolley into the stable and attached to two other cows, the flexible conductors leading from the motor being then attached by means of a suitable plug to an electric socket connected in a system of wiring, carrying a current of proper voltage to operate the motor. The operations of milking the cows, separating the milk and sterilizing the same will proceed at one time, and when the milk has been all extracted from these two cows the electric attachment plug will be withdrawn from the socket, the milking tubes of the machine will be detached from the cows and the machine will be again run out along the trolley to the dairy room. By thus proceeding no part of the interior of the machine or the receptacles is ever exposed to the atmosphere in the stable; thus contamination of the milk by the dust in suspension in the air of the stable can never occur. By the use of this improvement it is made possible to furnish milk to the consumer under the most sanitary conditions that can possibly be attained in practice.

In Fig. 8 the machine is shown as having secured to it a trolley wheel 62, arranged to travel upon a suitably supported wire 63, whereby the machine may be readily transported from one position to another, simply by moving it along on the wire support.

Having thus described my invention, what I claim as new and desire to secure by Letters Patent, is:

1. The combination with a portable receptacle, and means carried by said receptacle for separating cream from milk, of exhaust mechanism for producing a partial vacuum in said receptacle, and a milk duct discharging into said receptacle and adapted for attachment with a milk tube, said separating means being arranged to receive the milk discharged from the milk duct within the vacuous receptacle.

2. The combination with a portable receptacle, and means carried by said receptacle for separating cream from milk, of exhaust mechanism for producing a partial vacuum in said receptacle, a milk duct discharging into said receptacle and adapted for attachment with a milk tube, said separating means being arranged to receive the milk discharged from the milk duct within the vacuous receptacle, and operative connections between the exhaust mechanism and separating means, whereby the separating means may operate synchronously with the exhaust mechanism.

3. The combination with a portable receptacle having a removable cover, and means within the receptacle for separating cream from milk, of exhaust mechanism mounted on said cover for producing a partial vacuum in said receptacle, a milk duct discharging into said receptacle and adapted for attachment with a milk tube, and a conduit within said receptacle for conveying the milk discharged from the milk duct to the separating means.

4. The combination with a portable receptacle having a removable cover, and means within the receptacle for separating cream from milk, of exhaust mechanism mounted on said cover for producing a partial vacuum in said receptacle, a milk duct discharging into said receptacle and adapted for attachment with a milk tube, a conduit within said receptacle for conveying the milk discharged from the milk duct to the separating means, and operative connections between the exhaust mechanism and the extracting means, for actuating the separating means in synchrony with the exhaust mechanism.

5. The combination with a portable milk receiving receptacle, means within said receptacle for separating cream from milk, an auxiliary can supported on the outer side of the receptacle for receiving the cream, and a conduit extending from the separating means to the can, of exhaust mechanism for producing a partial vacuum in the receptacle and a milk duct discharging within the receptacle, said separating means being constructed and arranged to receive the milk as it is discharged from the milk duct.

6. The combination with a portable milk receiving receptacle, means within said receptacle for separating cream from milk, an auxiliary can supported on the outer side of the receptacle for receiving the cream, a connecting conduit between the separating means and the auxiliary can, having a joint therein, whereby the can may be disconnected from the separating means, and a valve in the connecting conduit between the separating means and joint, for closing the separating means to the external air, of exhaust mechanism for producing a partial vacuum in the receptacle, and a milk duct discharging within the receptacle, said extracting means being constructed and arranged to receive the milk as it is discharged from the milk duct.

7. The combination with a receptacle, of milk drawing mechanism associated therewith and discharging into said receptacle, means within said receptacle for separating cream from the milk, constructed and arranged to receive the milk discharged from the milk drawing mechanism, and means for heating the milk before its discharge to the interior of said receptacle.

8. The combination with a receptacle, of milk drawing mechanism discharging into said receptacle, means within said receptacle for separating cream from the milk and arranged to receive the milk discharged from the milk drawing mechanism and to discharge the cream outside said receptacle, and means for heating the cream before its discharge to the exterior of said receptacle.

9. The combination with a closed receptacle, of means for exhausting said receptacle, a milk duct discharging into said receptacle, means within said receptacle for separating cream from the milk, a conduit for conveying the milk from the milk duct to the separating means, and a heater surrounding said conduit.

10. The combination with a receptacle, of means for exhausting said receptacle, a milk duct discharging into said receptacle, means within said receptacle for receiving the milk discharged from the milk duct and separating cream from the milk and means for sterilizing the cream before the access of air thereto.

11. The combination with a receptacle, of means for exhausting said receptacle, a partition dividing said receptacle into compartments, milk ducts each discharging into one of the compartments and means in each of said compartments for receiving the milk from the milk duct associated therewith and separating cream from the milk and discharging the cream outside said receptacle.

12. The combination of a receptacle divided into two compartments, milk drawing mechanism adapted to milk two cows at once and discharge the milk from each cow into a separate compartment, means in each of said compartments for receiving the milk from its associated milk drawing mechanism, separating cream from the milk and discharging the same outside said receptacle, and an operative connection between said milk drawing mechanism and said separating means, whereby the operations of milk drawing and separating are caused to take place simultaneously.

13. The combination of a receptacle divided into two compartments, milk drawing mechanism adapted to milk two cows at once and discharge the milk from each cow into a separate compartment, means in each of said compartments for receiving the milk from the associated milk drawing mechanism and separating cream from the milk, an operative connection between said milk drawing mechanism and said separating means, whereby the operations of milk drawing and separating are caused to take place simultaneously, and means in each of said compartments for heating the contents.

14. The combination of a receptacle divided into two compartments, milk drawing mechanism adapted to milk two cows at once and discharge the milk from each cow into a separate compartment, and means in each of said compartments for receiving the milk from its associated milk drawing mechanism and separating cream from the milk, an operative connection between said milk drawing mechanism and said separating means whereby the operations of milk drawing and separating are caused to take place simultaneously, and means in each of said compartments for heating the milk therein.

15. Dairy machinery comprising milk drawing mechanism, means operatively connected therewith for separating the cream from the milk, and a removable container into which said separating means discharges, said container having means whereby it may be detached from the separating means without the access of air thereto.

16. A milking machine comprising a receptacle, means within said receptacle for separating the cream from the milk, an electrically-operated heater upon said receptacle, containing a conduit for the passage of milk to the separating means, a cover for said heater, and milk drawing mechanism mounted on said cover and arranged to discharge into the milk conduit in said heater.

17. The combination with a receptacle, of a removable heater comprising a tank arranged to be placed upon said receptacle and having compartments adapted to receive milk, milk drawing mechanism arranged to be mounted on said heater and adapted to milk cows and discharge milk from each cow into a separate compartment, and means for conducting the milk from said tank to said receptacle.

18. The combination with a receptacle, of a removable sterilizer comprising a tank arranged to be placed upon said receptacle and having compartments adapted to receive milk, milk drawing mechanism arranged to be mounted on said sterilizer and adapted to milk two cows and discharge milk from each cow into a separate compartment, and means for conducting the milk from said tank to said receptacle.

19. The combination with a receptacle, of a tank adapted to be superposed on the receptacle, said tank having two compartments for receiving milk, milk drawing mechanism adapted to be superposed upon said tank and discharging into said compartments thereof, a pipe leading from each of said compartments of said tank to said receptacle, and a heating rheostat in said tank for raising the temperature thereof.

20. The combination of a receptacle, a tank adapted to be superposed upon said receptacle, milk drawing mechanism adapted to be superposed on said tank, said tank having a plurality of compartments into which said milk drawing mechanism discharges, pipe leading from each of said compartments of the tank to the receptacle, electrically-operated heating means in said tank, and a thermostat for controlling the temperature of said tank.

21. The combination of a receptacle having a plurality of compartments, a heater adapted to be superposed on said receptacle and provided with a plurality of ducts leading therethrough and opening into said receptacle, milk drawing mechanism arranged to be mounted on said heater, said milk drawing mechanism being adapted to milk a plurality of cows and to discharge the milk from each cow into one of said compartments, and a thermostat arranged to automatically control the temperature of said ducts.

22. In a dairy machine, the combination of a receptacle, a compartment in the upper part of said receptacle, milk drawing mechanism discharging into said compartment, means in said receptacle for separating the cream from the milk, said separating means communicating with said compartment, and a float-controlled valve for regulating the flow of milk from said compartment to said separating means.

23. In a dairy machine, a receptacle, milk drawing mechanism discharging into said receptacle, means within said receptacle for separating the cream from the milk, a pipe arranged to receive the milk from the milk drawing mechanism and leading to said separating means, heating means surrounding said pipe, and an operative connection between said separating means and said milk drawing mechanism.

24. In a dairy machine, a receptacle, milk drawing mechanism discharging into said receptacle, means within said receptacle for separating the cream from the milk, a pipe arranged to receive the milk discharged from said milk drawing mechanism and leading to said separating means, a rheostat surrounding said pipe, and operative connection between said separating means and said milk drawing mechanism.

25. The combination of a receptacle, milk drawing mechanism discharging within said receptacle, means within said receptacle for separating the cream from the milk, a tube leading to said separating means, and means for automatically controlling the flow through said tube.

26. In a dairy machine, a receptacle, a separator contained therein, a second receptacle mounted outside thereof and having separable means for connecting the same to said separator, a pair of valves in said connecting means, means for exhausting said receptacle, and a milk duct discharging into the separator.

27. In a dairy machine, milk drawing mechanism, a milk receptacle, a heating device constructed and adapted to be placed underneath the milk drawing mechanism and upon the milk receptacle, and having a conduit for receiving the milk from the milk drawing mechanism and discharging the same into the receptacle and a thermostat arranged to control the temperature of said heating device.

28. In a dairy machine, a receptacle, means for exhausting said receptacle, a milk duct discharging into said receptacle, means within said receptacle arranged to receive the milk discharged from said milk duct and for separating cream from the milk, said separating means having a discharge duct, and an electric heating coil surrounding said duct.

29. Dairy machinery comprising a receptacle, milk drawing mechanism discharging thereinto, means in said receptacle for separating the cream from the milk, said separating means having a conduit arranged to receive the milk discharged from the milk drawing mechanism, and having an outlet duct for conveying the cream to the exterior of said receptacle, and means for heating said duct.

30. In dairy machinery, milk drawing mechanism, including a milk receiving receptacle, cream separating mechanism within said receptacle and arranged to receive the milk from the milk drawing mechanism, operative connections between said milk drawing mechanism and said cream separating mechanism, and means for heating the skim milk and cream after the same have been separated.

31. In dairy machinery, milk drawing mechanism, a cream separating device arranged to receive the milk from the milk drawing mechanism within a receptacle sealed from the external air, said cream separating device being operatively connected with said milk drawing mechanism, and means for sterilizing the milk and cream within said sealed receptacle.

32. The combination with a receptacle, of a milk heating device mounted thereon and adapted to heat the milk before it reaches the receptacle, a cover, an air exhauster, and a pulsator both mounted on the cover, and an operative connection between said receptacle and said pulsator.

In witness whereof, I have hereunto subscribed by name in the presence of two witnesses.

THEODORE UMRATH.

Witnesses:
CHARLES G. COPE,
CHARLES L. HOPKINS.